March 2, 1937. L. W. EGGLESTON 2,072,425
PUMP SYSTEM
Filed Feb. 25, 1933
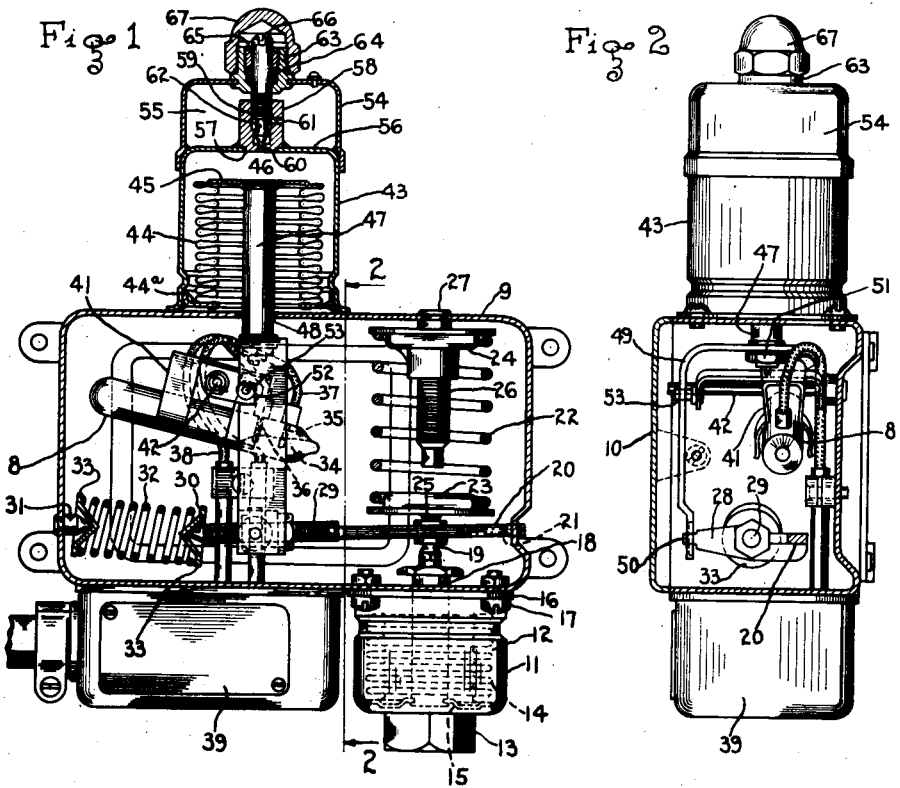
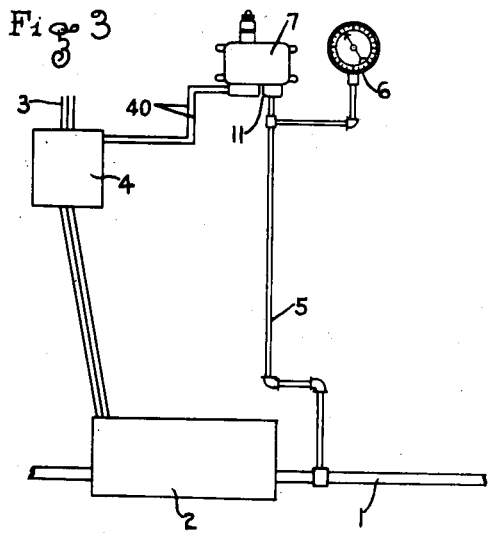
INVENTOR-
Lewis W. Eggleston
BY
his ATTORNEY- Patented Mar. 2, 1937

2,072,425

UNITED STATES PATENT OFFICE 2,072,425

PUMP SYSTEM

Lewis W. Eggleston, Detroit, Mich., assignor to Detroit Lubricator Company, Detroit, Mich., a corporation of Michigan Application February 25, 1933, Serial No. 658,539

8 Claims. (Cl. 200—83)

My invention relates to new and useful improvements in pump systems, and more particularly to a device for controlling the operation of a liquid supply pump.

An object of my invention is to provide a system in which the pump is controlled in response to pressure of the liquid discharged thereby.

Another object is to provide means to eliminate starting and stopping of the pump due to pulsations or surging in the pressure of the liquid discharged by the pump.

The invention consists in the improved system and in the construction and combination of parts comprising the control device, and the novelty of which will be particularly pointed out and distinctly claimed.

Referring to the accompanying drawing, to be taken as a part of this specification, I have fully and clearly illustrated a preferred embodiment of my invention, in which drawing—

Figure 1 is a view partly in vertical central section of a control device for embodiment in the system of my invention;

Fig. 2 is a view of the control device in section on the line 2—2 of Fig. 1, and Fig. 3 is a view partially diagrammatic of a pump system showing the embodiment of the control device therein.

Referring to the drawing by characters of reference, I designates a conduit or pipe line for supplying water or other liquid to a reservoir, or the like. Positioned in the conduit is a pump and motor for driving the same, preferably an electric motor, designated generally by the reference character 2. The motor is supplied with current from a main supply line 3 containing an automatically operable electric switch 4 which may be of the magnetic type. Connected into the conduit I on the outlet or discharge side of the pump 2 there is a pressure transmitting pipe or line 5 which may be provided with a pressure gauge 6. The pressure line 5 serves to transmit the pressure of the liquid from the conduit I to a control device 7 containing an electric switch means 8 which controls operation of the automatic switch 4.

The device 7 comprises a housing or casing 9 which is preferably substantially rectangular and may be provided with a removable cover or closure member 10. Secured to the underface of the bottom wall of the housing 9 is a pressure responsive means 11 comprising a substantially cylindrical cup-shaped casing 12 having an aperture through its bottom wall provided with a fitting 13 for connection of the interior of the casing 12 to the pressure line 5. Within the casing 12 there is a substantially cylindrical, circumferentially corrugated, longitudinally expansible and collapsible element or bellows 14 having a head or end wall 15, and which is secured and sealed at its other end to the casing 12. The element 14 and the casing 12 provide therebetween a pressure chamber with the element 14 forming a resilient and movable chamber wall. The casing 12 may be provided with a lateral flange 16 for securing the casing to the housing 9 by bolts and nuts 17, or the like. The head or end wall 15 carries a plunger or push rod 18 which extends into the interior of the housing 9 through an aperture in the bottom wall thereof. The free end of the plunger 18 is preferably conical, as at 19, and seats within a socket in the underface of a lever 20 positioned in the housing 9.

The lever 20 is fulcrumed at one end, as at 21, in the side wall of the housing 9 and projects therefrom substantially horizontally toward the opposite or other end or side wall of the housing. Movement of the lever 20 by the plunger 18 is opposed by a range determining spring 22 having end follower members or seats 23, 24. The member 23 is provided with a bearing point, or the like, 25 preferably substantially conical, and which seats in a bearing member carried by the top face of the lever 20. The follower member 24 is adjustably supported on a screw, or the like, 26 which is rigidly fixed in the top wall of the housing 9, as at 27. The free end of the lever 20 is provided with a laterally extending portion 28 through which is adjustably screw-threaded a pin or screw member 29. The pin 29 extends substantially parallel to the lever 20 and projects therebeyond, being provided with a substantially conical end or tip 30. Secured in the end wall of the housing 9 opposite the fulcrumed end of the lever 20, there is an abutment member 31. Positioned between the pin end 30 and the abutment 31 there is a spring 32, preferably of the helical coil type, having spring seats or follower members 33. The spring 32 is normally held under compression and determines the differential operation of the device, the differential being adjustable by means of the screw member 29.

The switch means 8 is preferably of the mercury tube type, comprising an elongated glass envelope or capsule containing a quantity of mercury 34 operable to make and break circuit between terminals 35, 36 within the capsule. The terminals 35, 36 are connected to suitable lead wires 37, 38, respectively, which extend into a terminal or outlet box 39. The wires 37 and 38 are connected within the box 39 to the circuit wires 40 connected to the automatic switch 4. The switch means 8 is supported in a carrier member 41 which is rockably or tiltably mounted on a shaft 42 so that the switch means 8 may be rocked or tilted to flow the mercury into or out of engagement with the contacts 35, 36 to control the circuit to the motor of the pump 2.

Supported on the top wall of the housing 9 there is a substantially cup-shaped container 43 having its bottom or underside closed and sealed by a longitudinally expansible and collapsible cylindrical element or metal bellows 44 having its upper or inner end closed and sealed by a head or end wall 45. The lower end of the bellows is secured and sealed to an annular member 44a which fits within the lower end of the container 43 to which it is sealed. The space within the container 43 and around the element 44 comprises a dash-pot chamber 46. The head or end wall 45 serves as a dash-pot plunger or piston and carries a plunger rod 47 which extends downward through the interior of the bellows and through an aperture 48 in the top wall of the housing 9. The end of the plunger rod 47 within the housing 9 is rigidly connected to the lever 20 adjacent its free end by means of a link or strap element 49. One end portion of the member 49, which is substantially vertical, is provided with an aperture to receive a projection 50 on the lever portion 28, and the other end of the member 49 which extends substantially horizontally is apertured to receive a reduced end portion of rod 47 to which it is secured by a nut, or the like, 51. A side edge of the vertical portion of the member 49 is provided with a slot or recess 52 which receives a pin or projection 53 rigidly fixed to the carrier member 41. Mounted on the top of the container 43 there is a substantially cup-shaped container or casing member 54 which defines with the end wall of container 43 a reservoir or overflow chamber 55. The containers 43 and 54 together define a hollow casing having internal chambers 46 and 55 which are separated by the end wall 56 which serves as a partition. Through the wall or partition 56 there is an aperture 57 in which a plug member 58 is secured and sealed. Through the plug member 58 there is a bore 59 which opens at its ends into the chambers. The bore is of reduced diameter substantially in the plane of the partition 56 to provide a valve port and seat 60. Through the side wall of the plug member within chamber 55 there is a port 61 establishing communication between the bore 59 and the reservoir 55. The port 60 is controlled by a valve member 62 which is screw-threaded in the bore 59 for adjustment relative to its seat. The port 60, bore 59, and passage 61 together comprise a passage connecting the chamber 46 and the reservoir 55. The valve member 62 is provided with a stem which extends upwardly through a packing sleeve 63 secured and sealed in the top wall of the casing member 54. Leakage through the sleeve 63 around the valve member 62 is prevented by packing material 64 held under compression by a packing nut 65 screw-threaded into the bore of the sleeve 63. The valve member 62 is preferably provided with a screw-driver slot 66, or the like, by which the valve may be adjusted. The sleeve 63 is provided with a cap or cover 67, preferably screw-threaded thereon.

The operation of the system and the control device when embodied therein is as follows: The chamber 46 is filled with liquid, and also the reservoir 55, to the level of the port 61. The valve member 62 is operated to open the port 60 so that liquid may be discharged or expelled from the chamber 46 into the reservoir 55. The springs 22 and 32 are adjusted to determine the maximum desired pressure in the conduit 1 at which the switch means 8 will be actuated to stop the pump 2. If current be now supplied to the main line 3, current will flow through means 8 and circuit will be completed through the switch 4 to energize the motor and pump 2. The pressure in the conduit 1 on the outlet side of the pump will gradually build up as the pump continues to operate but due to the action of the pump the pressure will vary in the line 1, rising and falling above and below the mean of the gradually increasing pressure. The liquid in the chamber 46 will prevent operation of the switch means 8 by the pulsations or surging of the pressure in the conduit 1 and transmitted to the responsive means 11 through the line 5. The restriction afforded by the port 60 to flow of liquid from chamber 46 into the reservoir 55 acts to dampen and substantially eliminate transmission of the fluctuations in pressure acting on the means 11 to the switch means 8. The action of the dash-pot retards the movement of the lever 20 sufficiently so that the switch means 8 will not be rocked to break the circuit through the pump motor until the mean pressure is reached for which the springs 22 and 32 are set. The action of the dash-pot is also aided by the lost-motion connection between the member 49 and the pin 53, the slot 52 in the edge of member 49 being of sufficient length to permit some movement of the lever 20 before the lower edge of the slot engages the pin 53 to move the switch means 8.

What I claim and desire to secure by Letters Patent of the United States is:

1. A device of the character described, comprising a supporting member, a lever fulcrumed on said member, pressure responsive means operatively connected to said lever, adjustable means opposing operation of said lever by said responsive means, switch means movably supported by said member, means operatively connecting said switch means and said lever, a dash-pot chamber containing a liquid and carried by said supporting member and having a plunger, means connecting said plunger to said switch means, a closed liquid receiving reservoir of sufficient capacity to receive all of the liquid from said chamber during adjustment of said opposing means and a passage connecting said reservoir and said dash-pot chamber whereby to permit flow of liquid from and to said chamber upon operation of said plunger.

2. A device of the character described, comprising a supporting member, a lever fulcrumed on said member, pressure responsive means operatively connected to said lever, means opposing operation of said lever by said responsive means, switch means movably supported by said member, means operatively connecting said switch means and said lever, a dash-pot chamber containing liquid and carried by said supporting member and having a plunger, means connecting said plunger to said switch means, a closed liquid receiving reservoir, and a passage connecting said reservoir and said dash-pot chamber, a valve controlling liquid flow through said passage and operable to regulate the rate of movement of said plunger.

3. A device of the character described, comprising a housing, switch means mounted in said housing, pressure responsive means carried by said housing, a dash-pot casing secured to a wall of said housing, said casing having a resilient wall, a thrust rod connecting said resilient wall and said responsive means, lost-motion means operatively connecting said rod and said switch means, said casing containing liquid opposing movement of said wall by said responsive means, a closed reservoir to receive liquid expelled from said casing, a passage connecting the interior of said casing and said reservoir for transmitting liquid therebetween, and a valve controlling liquid flow through said passage and operable for regulating the rate of movement of said thrust rod.

4. A device of the character described, comprising a housing, switch means mounted in said housing, pressure responsive means carried by said housing and operatively connected to said switch means, a hollow sealed casing carried by said housing, a partition dividing the interior of said casing into a dash-pot chamber and a reservoir, said chamber containing liquid, a port through said partition for transmission of liquid between said chamber and said reservoir, a metal bellows member positioned in said chamber and having one end secured and sealed to the wall of said casing, a head closing and sealing the other end of said bellows member, a plunger rod rigidly connecting said bellows member and said responsive means whereby certain of the liquid in said chamber must be expelled into said reservoir prior to operation of said switch means by said responsive means, and a valve controlling liquid flow through said passage and operable to regulate the rate of movement of said plunger rod.

5. A device of the character described, comprising a supporting member, switch means carried by said supporting member, a power means for actuating said switch means, a dash-pot chamber carried by said supporting member and containing a liquid, a dash-pot piston cooperable with said liquid and opposing actuation of said switch by said power means, and a closed liquid receiving reservoir in communication with said dash-pot chamber and capable of receiving and holding all of the liquid of the dash-pot chamber out of operative relation to said piston.

6. A device of the character described, comprising a supporting member, switch means carried by said supporting member, pressure responsive means for actuating said switch means, adjustable means opposing operation of said switch means, a dash-pot chamber containing a liquid and having a plunger operatively connected to said switch means, a closed liquid receiving reservoir of sufficient capacity to receive all of the liquid from said chamber and to maintain the liquid out of contact with said plunger during adjustment of said opposing means, and by-pass means operable after adjustment of said opposing means to establish communication between the dash-pot chamber and the reservoir whereby flow of liquid by movement of the plunger from and to said chamber will oppose operation of said plunger.

7. A device of the character described, comprising a supporting member, switch means carried by said supporting member, pressure responsive means for actuating said switch means, adjustable means opposing operation of said switch means, a dash-pot chamber containing a liquid and having a plunger operatively connected to said switch means, a closed liquid receiving reservoir of sufficient capacity to receive all of the liquid from said chamber and to retain the liquid out of cooperative relation to said plunger during adjustment of said opposing means, by-pass means providing communication between the dash-pot chamber and the reservoir whereby the flow of liquid from and to said chamber by operation of said plunger acts to oppose operation of said plunger, and valve means controlling flow of the liquid through said by-pass.

8. In a device of the character described, a dash-pot structure containing a liquid and having a piston opposed in movement by the liquid and comprising a container having a dash-pot chamber with an opening in a wall thereof, a casing mounted on said container and having an open side disposed toward the opening into said container, said casing cooperating with the wall of said container to provide a reservoir chamber in communication with the first-named chamber through the opening in the wall of said container and through which opening the liquid flows back and forth from one chamber to the other, and an adjustable valve controlling said opening, said valve being adjustable to vary the rate of flow through said opening.

LEWIS W. EGGLESTON.